United States Patent [19]
Takano et al.

[11] Patent Number: 5,115,310
[45] Date of Patent: May 19, 1992

[54] NEWS PROGRAM BROADCASTING SYSTEM

[75] Inventors: Masayuki Takano, Tokyo; Kuniharu Onozuka, Kanagawa; Fumihiro Nagasawa, Kanagawa; Akihiko Matsumoto, Kanagawa, all of Japan

[73] Assignee: Sony Corporation, Tokyo, Japan

[21] Appl. No.: 338,272

[22] Filed: Apr. 14, 1989

[30] Foreign Application Priority Data

Apr. 16, 1988 [JP] Japan .................................. 63-94156

[51] Int. Cl.⁵ .......................................... H04M 5/222
[52] U.S. Cl. ........................................... 358/185
[58] Field of Search .................. 358/84, 86, 142, 146, 358/147, 185

[56] References Cited

FOREIGN PATENT DOCUMENTS 0084382  4/1988  Japan .

OTHER PUBLICATIONS

The NEC Research and Development Article, No. 84, Jan. 1987.

The NEC Research and Development Publication, No. 35, Oct. 1974.

German Language Publication Technische Mitteilungen Des RFZ.

"Automatic Program Control Systems for Television Broadcasting" by Motohashi; NEC Res. Developement (Japan) No. 17, Apr. 1970, pp. 35-45.

"Television network automated by minicomputer-controlled channels" by Anon; Computer Design, vol. 15, No. 11, Nov. 1976, pp. 50, 59, 62, 66.

"A New Presentation Switching System" by Fenton; Sound and Broadcasting (GB) vol. 11, No. 3, 1970, pp. 22-28.

Primary Examiner—John W. Shepperd
Attorney, Agent, or Firm—Lewis H. Eslinger; Jay H. Maioli

[57] ABSTRACT

In a news program broadcasting system reference codes are assigned to news materials when a cue sheet is prepared and when the news materials are edited. These reference codes are compared with each other when the news materials are transmitted, whereby the news materials are transmitted under simple and reliable control.

8 Claims, 21 Drawing Sheets

FIG.15

| ONAIR | STRENGTHENED YEN PASSES ¥120-LINE 3:00 | CAMERA 1 | STILL 1 | VTR 1 | NET 1 |
|---|---|---|---|---|---|
| | | | | | |
| NEXT | D AIR LINES INTERVIEW WITH K 5:00 | CAMERA 1 | VTR 1 | STILL 1 | STILL 2 |
| STILL 3 | VTR 2 | | | | |

| THE EVENING NEWS (18:00~18:28) | | | | FEB. 23. 1988 |
|---|---|---|---|---|
| NEWS | BETCAM/SP | 🐻 | 🍁⚬⚬⚬ | 🏠 |
| 1. OPENING 0:15 | 2. HEAD LINE 2:15 | 3. PRESIDENT ELECTION 4:00 | 4. CALGARY OLYMPIC 7:25 | 5. ABC 1:30 | 6. DEF 4:25 |
| | | | | END | |
| 7. SPORTS- FOOTBALL 2:45 | 8. SPORTS- ICEHOCKEY 2:30 | 9. CUCHION 0:15 | 10. WEATHER REPORT 2:30 | 11. ENDING 0:10 | |

HEDX — (header area, top-left)
ARA11, ARA12 — (top-right areas)
MR1 — (bottom area)

| CUE SHEET | CHANGE | DELETE | INSERT | REGISTRATION | MONITOR | QUIT |

NEWS PROGRAM BROADCASTING SYSTEM

BACKGROUND OF THE INVENTION

1. Field of the Invention

The present invention relates to a news program broadcasting system and, more particularly, to such that a system is suitable for application to a television broadcasting system.

2. Description of the Prior Art

The news program in television broadcasting has an aim to transmit a wide variety of news sources to the viewers promptly and accurately, and it is made out by compiling news sources such that they are put on the air according to the edited order in units of seconds within a length of time limited by predetermined criteria.

In preparing a news program practically, it is necessary to provide scenes having atmospheres that viewers will accept with interest and, according to the kind of the news to be broadcast, to arrange the scenes to be easy to understand to the degree as required, and further, the program must be accurately contained within a limited length of time. It is also necessary to have ever occurring news sources included in the news program as soon as possible.

In order to compile such news sources involving unexpected facts and occurring at unexpected times and places into a news program within a predetermined period of time, it is necessary for the reporters, editors, and other news staff members to be able to compile those materials forming news sources into a news program as simply and accurately as possible and also to have the thus compiled news program transmitted sequentially and uninterrupted. If there is provided such a system meeting the above mentioned requirements and, further, capable of changing the order of transmission in each program, as required, when a matter of urgency occurs, it will become possible to broadcast a news program enhancing the reliability reliance of the viewers on it.

In producing a news program, it is necessary that news sources to be broadcast are selected quickly and accurately from the whole of a wide variety of news sources with various conditions such as urgency of the news sources and interests of the viewers in them taken into consideration, and therefore, even while a news program is on the air or immediately before it, it is desired that the news staff are enabled to manually check the state of the transmission as required or make necessary changes in the program.

SUMMARY OF THE INVENTION

The present invention was made in view of the above points and it is an object of the invention to provide a news program broadcasting system enabling the reporter, editor, and other news staff to keep collected news materials of a wide variety in good order and, when they consider it necessary to broadcast some of them, to incorporate them into a news program positively and with the simplest possible operation.

In order to solve these problems, the present invention, in a news program broadcasting system (NEWS) for sequentially transmitting a plurality of news materials SM1-SMN according to a cue sheet CUS, comprises the steps of adding first reference codes, at the time of preparing the cue sheet CUS, to each of the news materials SM1-SMN forming the cue sheet CUS, adding second reference codes being the same as the first reference codes, at the time of editing news materials SM1-SMN forming the cue sheet CUS, to these news materials, and automatically checking, at the time of transmitting the edited news materials SM1-SMN, the first reference codes added to the news materials SM1-SMN specified in the cue sheet CUS with the second reference codes added to the edited news materials SM1-SMN.

According to the present invention, since it is arranged such that the same reference codes as those added to the news materials SM1-SMN when a cue sheet CUS is prepared are added to the news material SM1-SMN when these are edited and the first and second reference codes are automatically checked with each other when the news materials SM1-SMN are transmitted, the news material SM1-SMN specified in the cue sheet CUS are ensured to be sequentially transmitted, and further, since the control of the news material SM1-SMN during the course from the edition of the news materials SM1-SMN to the transmission thereof is made possible to be performed based on the reference codes, a news program broadcasting system capable of prompt and positive processing of news materials SM1-SMN can be realized.

BRIEF DESCRIPTION OF THE DRAWINGS

FIG. 15 to FIG. 18 are schematic diagrams showing display screens of a material monitor of another embodiment;

FIG. 20 and FIG. 21 are schematic diagrams showing a still further embodiment of a material monitor and an item monitor.

DETAILED DESCRIPTION OF THE PREFERRED EMBODIMENTS

An embodiment of the present invention will be described below with reference to the accompanying drawings.

Figure 1:
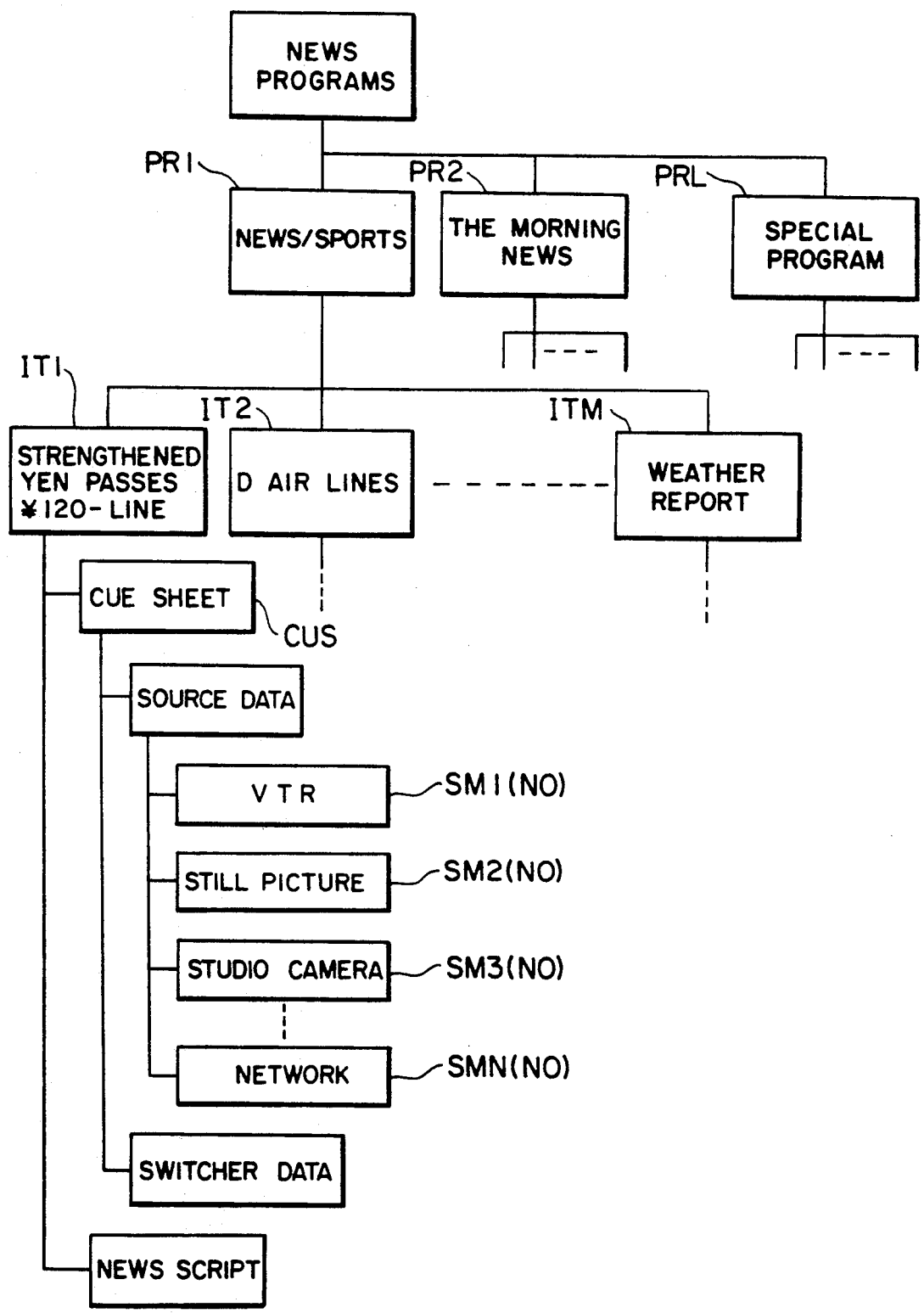
FIG. 1 is a system diagram showing a classification of news data used in a news program broadcasting system according to the present invention.

News source data to be transmitted in news programs are classified into three levels of "program", "item", and "material" as shown in FIG. 1. All the news materials are assigned, to specify each news material, with reference data (hereinafter, to be called "ID data") formed in accordance with such classification and the news materials are controlled and processed according to the ID data.

News programs in a broadcasting station for a day are classified into the first, second, . . . Lth "program" data according to the sequence of the times of day when they are broadcast, and each program is called by a program name, such as "News/Sports", "The Morning News", ..., "Special Program", and assigned with individual program codes PR1, PR2, ..., PRL.

The first, second, ..., Lth "program" data are each made up of the first, second, ..., Mth "item" data, and each "item" data is called by an item name indicating the contents of the news such as "The Strengthened Yen Passes 120-line", "D Air Lines", ..., "Weather Report", each being assigned with a specific item code IT1, IT2, ..., ITM.

Each "item" contains "materials" such as "VTR" video, "Still picture" graphic, "Camera" video, ..., "Network" video, and each of the "materials" is assigned with a material code such as SM1, SM2, SM3, ... SMN and a number code NO.

The material number code is provided to distinguish between data when there are included plural data in the same "material".

In practice, each item data is made up of a set of cue sheet data, in which the pertinent materials are arranged according to the order of time, and news scripts to be announced, and each cue sheet data is made up of pieces of material data and switcher data.

Thus, each news material of news programs can be specified by an ID code made up of the program code PRL (L=1, 2, ..., L), item code ITM (M=1, 2, ..., N), material code SMN (N=1, 2, ..., N), and material number code (NO1, NO2, ...). In the news program broadcasting system according to the present embodiment, processing of the materials is carried out based on the ID data.

Figure 2:
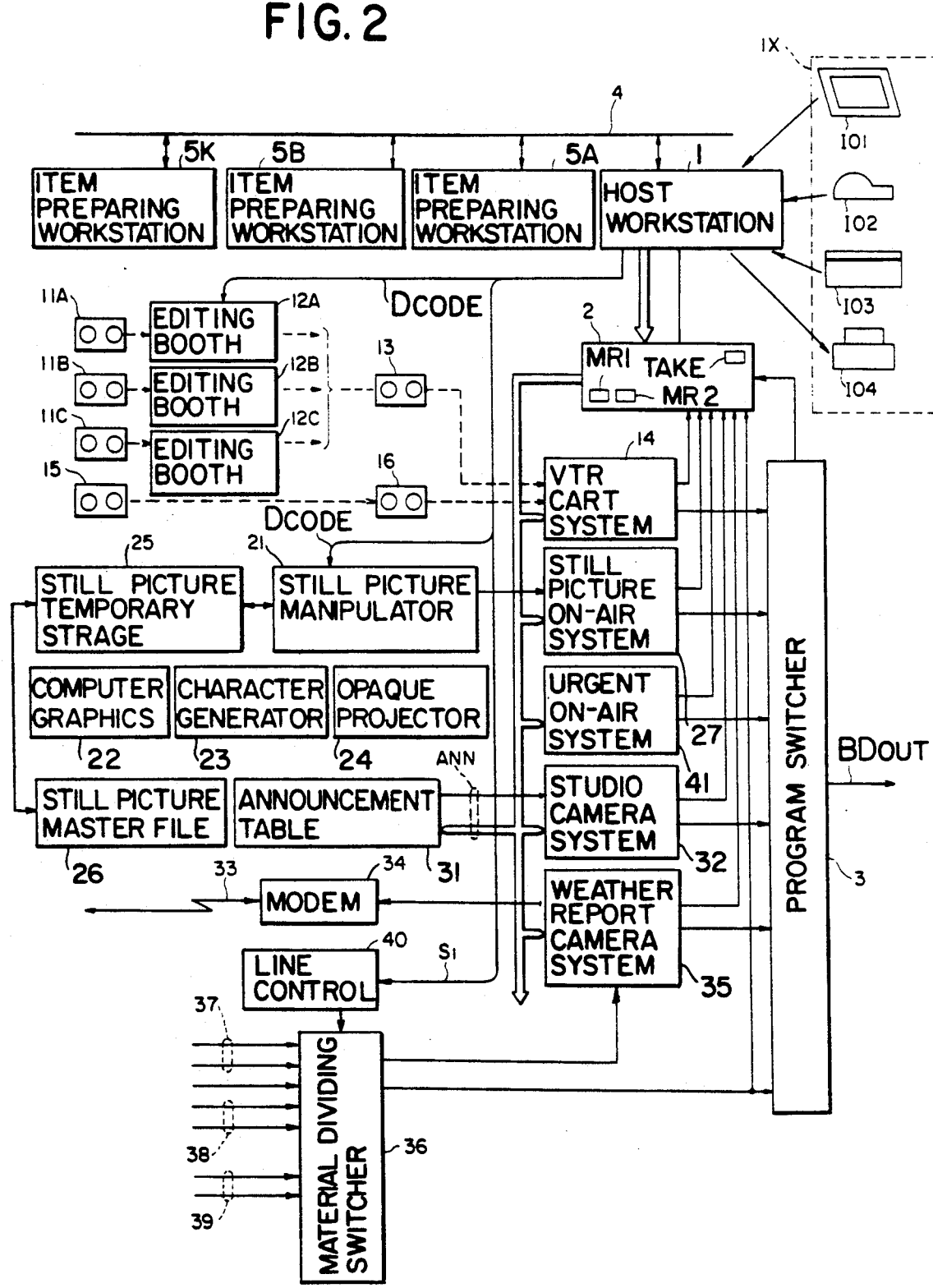
FIG. 2 is a block diagram showing an embodiment of a news program broadcasting system according to the present invention.

Referring to FIG. 2, NEWS denotes the whole of a news program broadcasting system, wherein pieces of "item" data constituting each "program" data are prepared under the control of a host workstation 1 and, at an on-air period, pieces of "material" data included in the prepared "item" data are transmitted one by one by an automatic controller 2 through a program switcher 3 as a main line output $BD_{OUT}$.

The news program broadcasting system NEWS has workstations 5A, 5B, ..., 5K connected to the host workstation 1 through a local transmission line 4. The reporter in charge of each item processes collected "material" data using the workstation 5A, 5B, ..., 5K to prepare a cue sheet CUS for each item and stores the data for the cue sheet CUS in the host workstation 1.

Here, the cue sheet CUS is a sheet in which the times of transmission of the pieces of "material" data for each "item" are arranged as a schedule, and, dependent on it, the pieces of "material" data included in each item are transmitted at the on-air period.

In practice, the news desk in a news department controls the overall organization of the news program, decides the "items" of each "program", and assigns the reporter in charge and time to each "item". The reporter assigned to each item makes a plan of material organization for the "item" and makes out the contents of the item (i.e., news materials, time, news script to be announced) and feeds them back to the news desk.

Generally, the desk decides a final version of the itemwise data allotment after the above described operations have been repeated several times. The reporter prepares a cue sheet based on the final version and, according to the material organization plan, sends requests to an electronic video editing room (ENG editing room) for edition of electronic video material (ENG material) and a computer graphics editing room (CG editing room) for producing telops, still pictures, and so on. Thus, materials included in the final version of the itemwise data allotment are edited.

The electronic video material is prepared in editing booths 12A, 12B, 12C by editing material tapes 11A, 11B, 11C gathered at collection of data into a tape for transmission 13, and the tape for transmission 13 is loaded on a tape recorder (VTR) cart system 14 and it is transmitted through the program switcher 3 at the on-air period.

An urgent tape 15 carried in after urgent data gathering is directly loaded on the VTR cart system 14 as a tape for urgent transmission 16.

The telops and still pictures are produced in a still picture manipulator 21 by operating a computer graphics 22, character generator 23, and opaque projector 24 and stored into a still picture master file 26 through a still picture temporary storage 25.

The thus stored still picture material is read by the still picture manipulator 21 out of the still picture master file 26 through the still picture temporary storage 25 at the on-air period, and delivered through a still picture transmission system 27 to the program switcher 3.

The camera video material is put together with information to be announced ANN obtained from an announcement table 31 and delivered through a studio camera system 32 to the program switcher 3.

Further, by reading data from a private line 33 through a modem 34 into a weather report camera system 35, and by supplying weather report camera data acquired from a microwave line 37 through a material dividing switcher 36 to the weather report camera system 35, "Weather Report" data is delivered to the program switcher 3.

The "Network" information is supplied from the microwave line 37, network 38, external line 39 directly to the program switcher 3 through the material dividing switcher 36.

In practice, the data from the material dividing switcher 36 is taken in by the control of a line controller 40 responding to line reserve information $S_1$ supplied from the host workstation 1.

In the present embodiment, urgent information previously stored in an urgent transmission system 41 is adapted to be delivered, according to the need, to the program switcher 3 under the control of the automatic controller 2.

The host workstation 1 has a handwriting input tablet IO1, mouse IO2, image reader IO3, and a printer IO4 as its input/output devices 1X.

Figure 3:
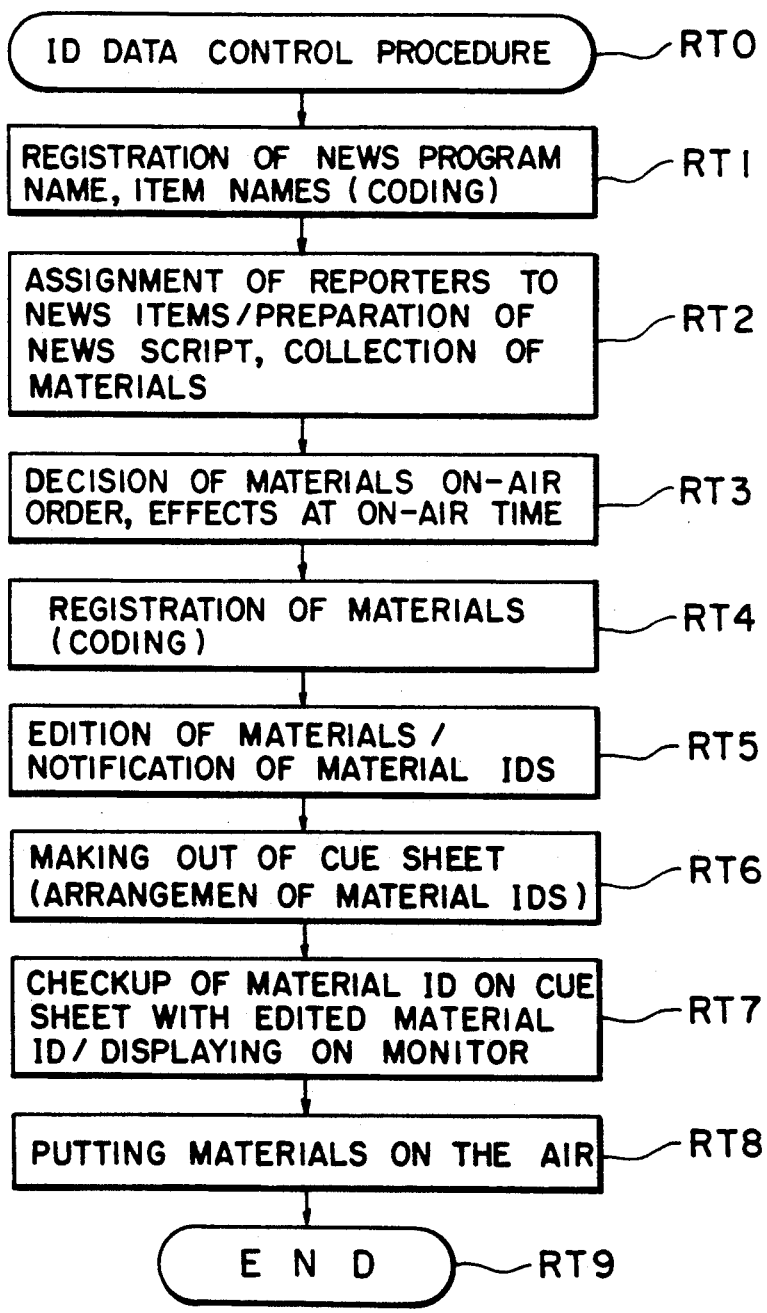
FIG. 3 is a flow chart showing an ID control procedure at the time of news production.

In the news program broadcasting system NEWS, control of news materials in news production is performed according to an ID data control procedure RT0 shown in FIG. 3.

At step RT1, the news desk inputs the name of a news program to be produced and the names of items forming the news program by handwriting using the host workstation 1 and registers these after confirmation. At the time of the registration, a program code PR1, PR2, ..., PRL is given to the "program" and the item codes IT1, IT2, ..., ITM are given to the "items" in the order of their arrangement.

At the next step RT2, the news desk assigns a reporter to each news item, and then, the assigned reporter prepares a news script for each news item and collects news materials such as still pictures and VTR tapes.

At the next step RT3, the reporter based on the collected news materials contemplates a story to be transmitted in the "item" and, thereupon, determines the "materials" and the effects to be provided at the time of transmission.

As the order of transmission of the "materials" is thus determined, the material codes SM1, SM2, . . . , SMN are determined according to their order of transmission, and also, the number codes NO for each "material" are determined.

The reporter, at the next step RT4, registers material codes and number codes in an ID file provided in the host workstation 1 using the workstation 5A-5K and thereby effects the coding.

In the following step RT5, the reporter sends a request for edition of the "materials" to the news room, whereupon the news room edits the "materials". At this time, the editing booths 12A-12C and the still picture manipulator 21 in the news room are in receipt of code data $D_{CODE}$ indicating each of the "material" codes SM1-SMN and the "material number" codes NO sent from the host workstation 1, and the news room adds the material code and number code to the "materials" edited thereby and stores them in the VTR cart system 14 and the still picture master file 26.

The reporter, sending out the above request for edition, prepares a cue sheet CUS using a workstation 5A-5K at step RT6.

The cue sheet CUS sets out the order of transmission of the materials at the on-air period and the effects to be added to the materials programmed according to the order of time. The reporter selects the program and also selects engineering items constituting the program and thus sequentially inputs the materials constituting the news item.

More particularly, the reporter reads the names of the program and the item, which are already registered in the host workstation 1 by the news desk, through the local transmission line 4 from the workstation 5A-5K, and thereupon sequentially inputs the "materials" constituting the "item" to thereby make out the cue sheet CUS.

Each of the "materials" constituting the thus prepared cue sheet CUS is provided with the program code/item code/material code/number code, and thus, it follows that the cue sheet has material IDs formed of combinations of these codes arranged thereon according to the order of transmission at the on-air period.

The data representative of the thus prepared cue sheet CUS is transferred to the host workstation 1 to be stored therein, and the host workstation 1 makes out from the cue sheet a device control file (wherein the order of control of the devices and effects to be provided at the time of switching of the switcher are stated) and a material ID file (wherein material IDs are arranged according to the order of control) and retains these files.

At the period of transmitting the news materials, a news staff member causes the automatic controller 2, by means of the host workstation 1, to carry out automatic ID checking of the material IDs in the cue sheet CUS with the material IDs of the edited "materials" and confirms the results of checking by having them displayed on a monitor at step RT7, and thereafter, puts the "materials" on the air at step RT8. Thus, the procedure for controlling the ID data is ended at step RT9.

Figure 4:
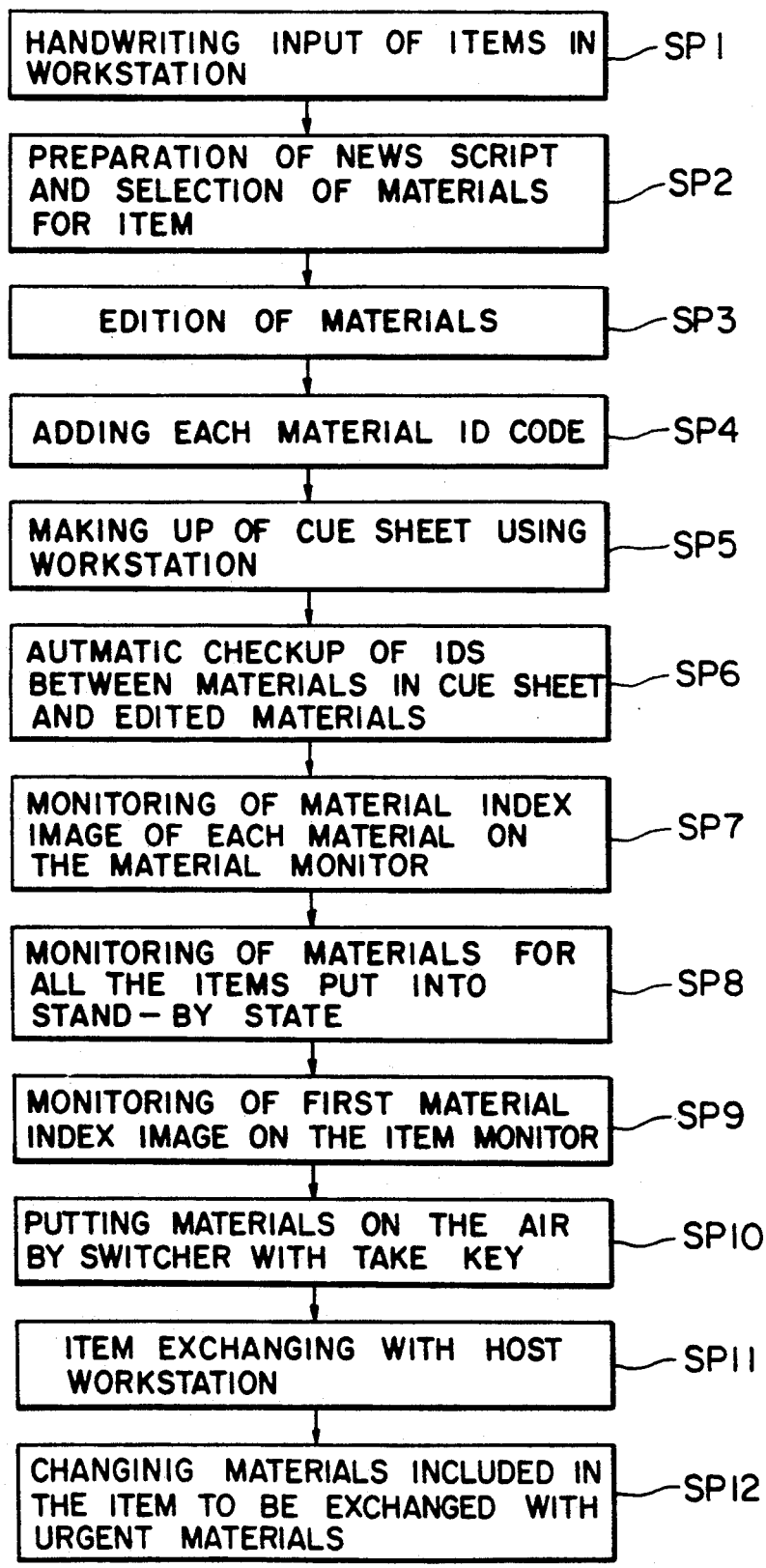
FIG. 4 is a flowchart showing a procedure for producing a news program.

In the news program broadcasting system NEWS of FIG. 2, the automatic control system centering around the automatic controller 2 installed together with the host workstation 1 in the news sub executes the working procedure shown in FIG. 4, associated with manual operation of the news staff member, and thereby, it automatically executes production of the information to be transmitted and processing for putting the information on the air, having the program switcher 3 and instruments connected thereto automatically controlled. Through the course of such automatic control, the news staff member is enabled to easily confirm the production condition of the "materials" constituting each "item" and the contents of the "materials" being prepared for transmission by having these displayed on a monitor.

First, at step SP1 in FIG. 4, the news desk inputs by handwriting "programs" and "items" using the handwriting input tablet IO1 (FIG. 7) and a mouse IO2 of the host workstation 1.

Figure 7:
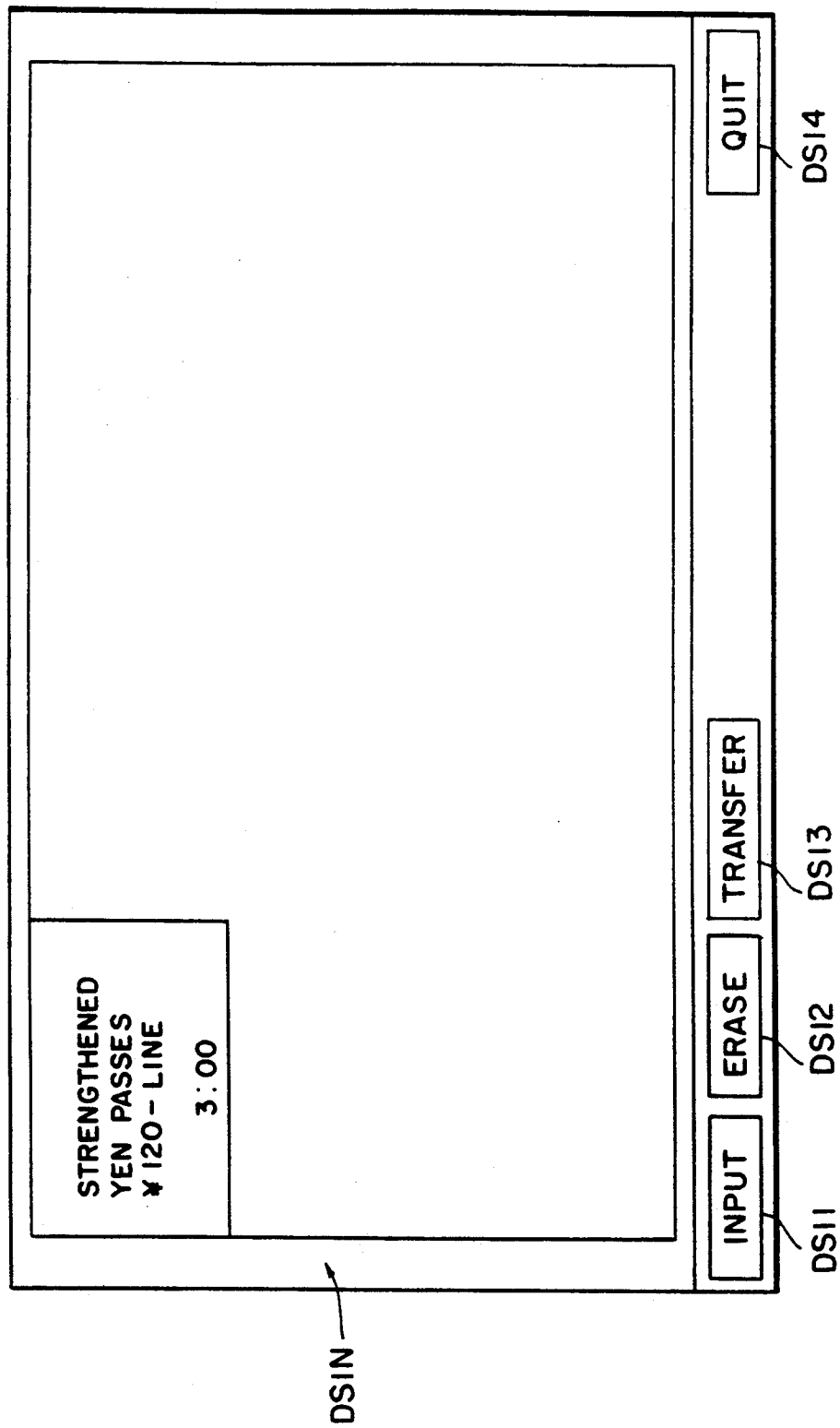

The inputting is effected by handwriting the name of an item to be registered (for example, "The Strengthened Yen Passes   120-line 3:00") on the display screen DSIN of the handwriting input tablet IO1 as shown in FIG. 7 and placing the cursor on "Program Register" input display portion DS1 and "Program Display" input portion DS2 (they are displayed on an initial screen) on the display screen DDS of the host workstation 1, and then clicking the button of the mouse (this will be called "click input").

More particularly, on the initial screen (FIG. 5) of the host workstation 1, if the "Program Register" input display portion is click input, then the name of the program handwriten on the tablet IO1 is registered in the host workstation 1, and following such registering procedure, the names of the first, second, . . . , Ltd "prgrams" (FIG. 1), i.e., "News/Sports", "The Morning News", . . . , "Special Program", and their broadcast times can be registered.

Figure 6:
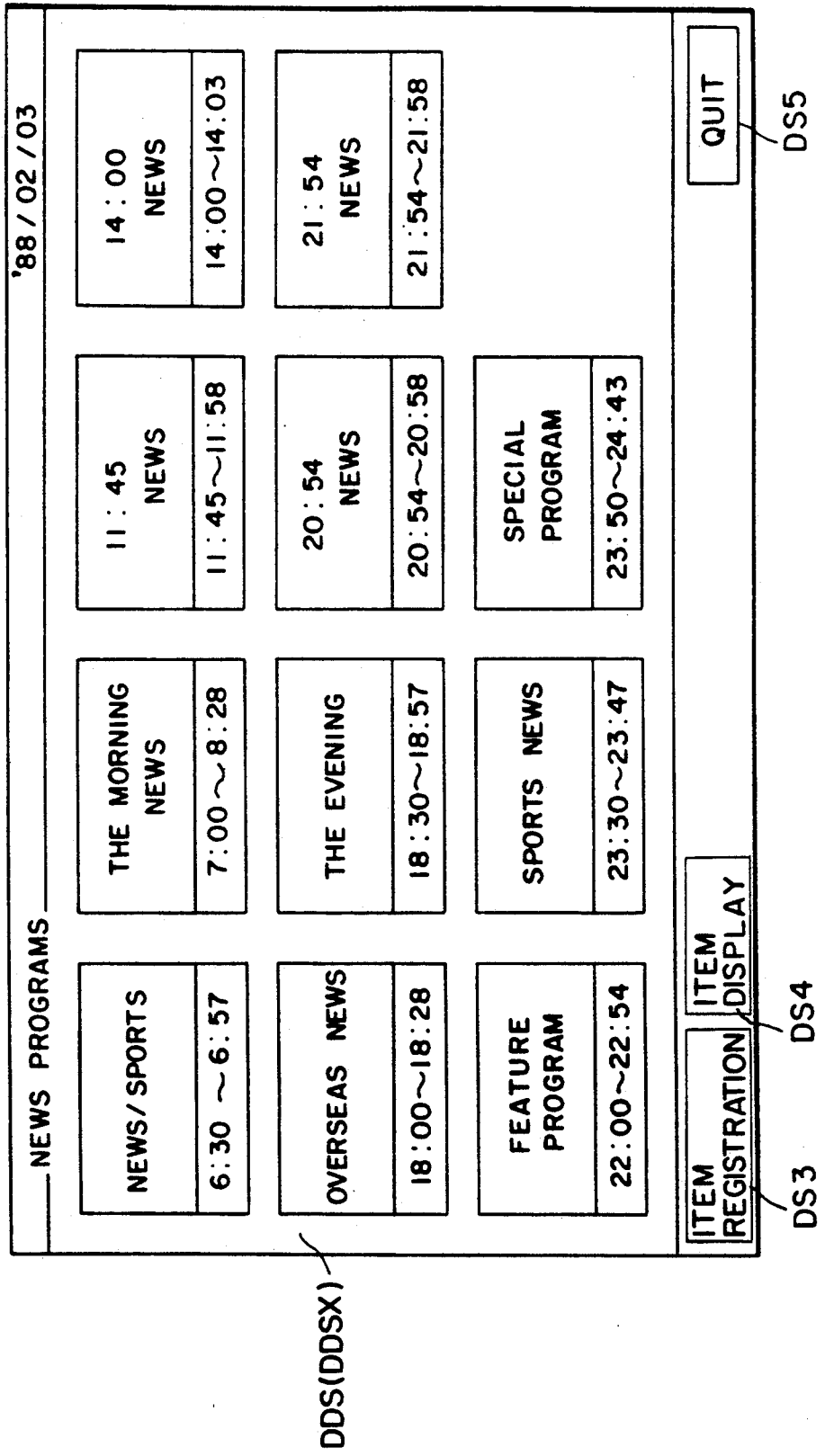

In contrast, if the "Program Display" input display portion DS2 on the display screen DDS is click input, the host workstation 1 displays the registered program names and broadcast times, according to, for example, the order of the times of day as shown in FIG. 6, and also displays "Item Register" input display portion DS3, "Item Display" input display portion DS4, and "Quit" display portion DS5.

In FIG. 6, if the "Item Register" input display portion DS3 and the program name are click input, then the name of the item from the handwriting input tablet IO1 (for example, "The Strengthened Yen Passes   120-line 3:00") constituting the program having that program name is displayed on the display screen DDS and it is also registered (FIG. 7).

Figure 8:
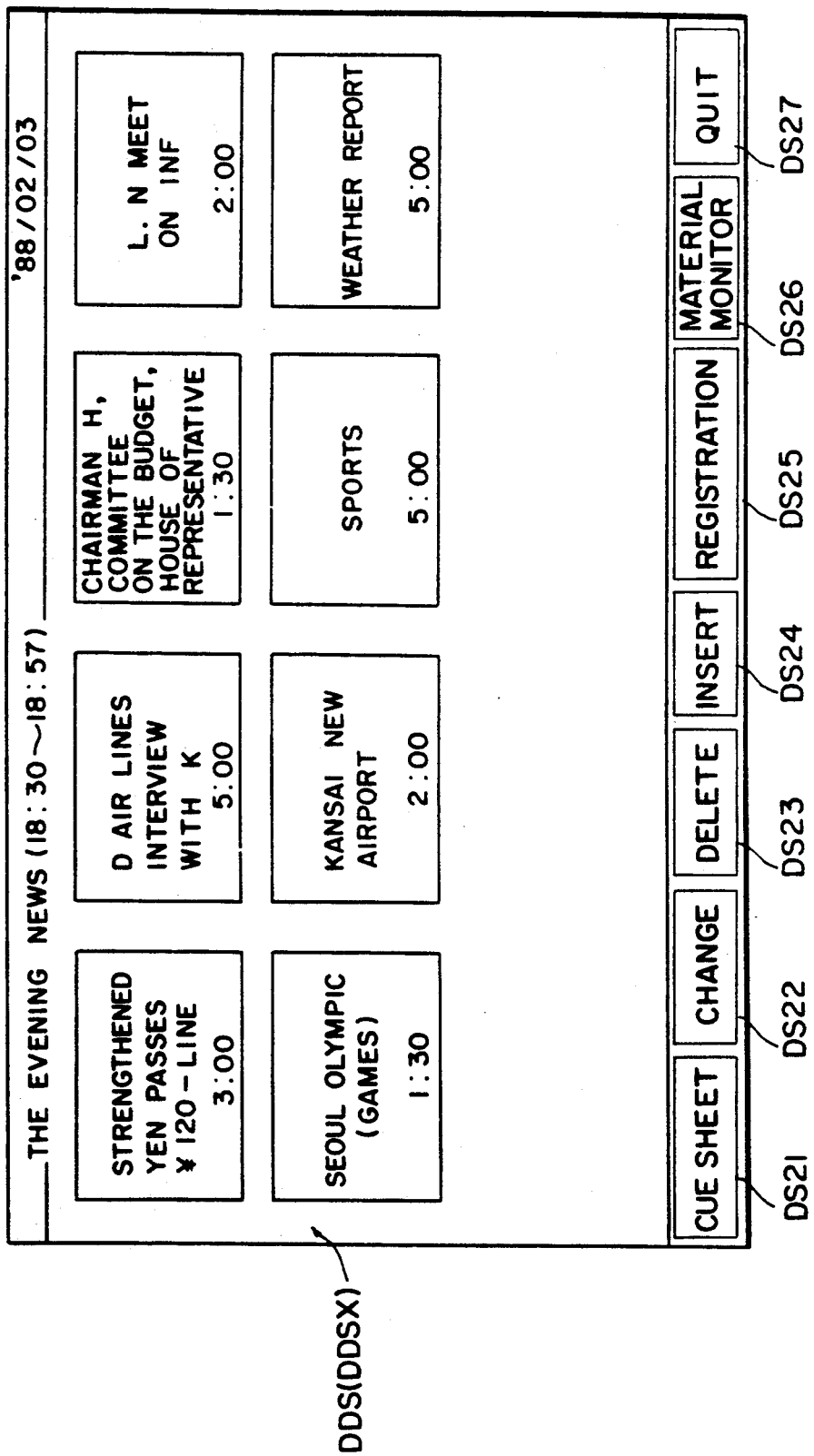

The items thus registered in the host workstation 1 can be displayed all together on the display screen DDS as shown in FIG. 8 when the "Item Display" input display portion DS4 in FIG. 6 is click input.

Figure 5:
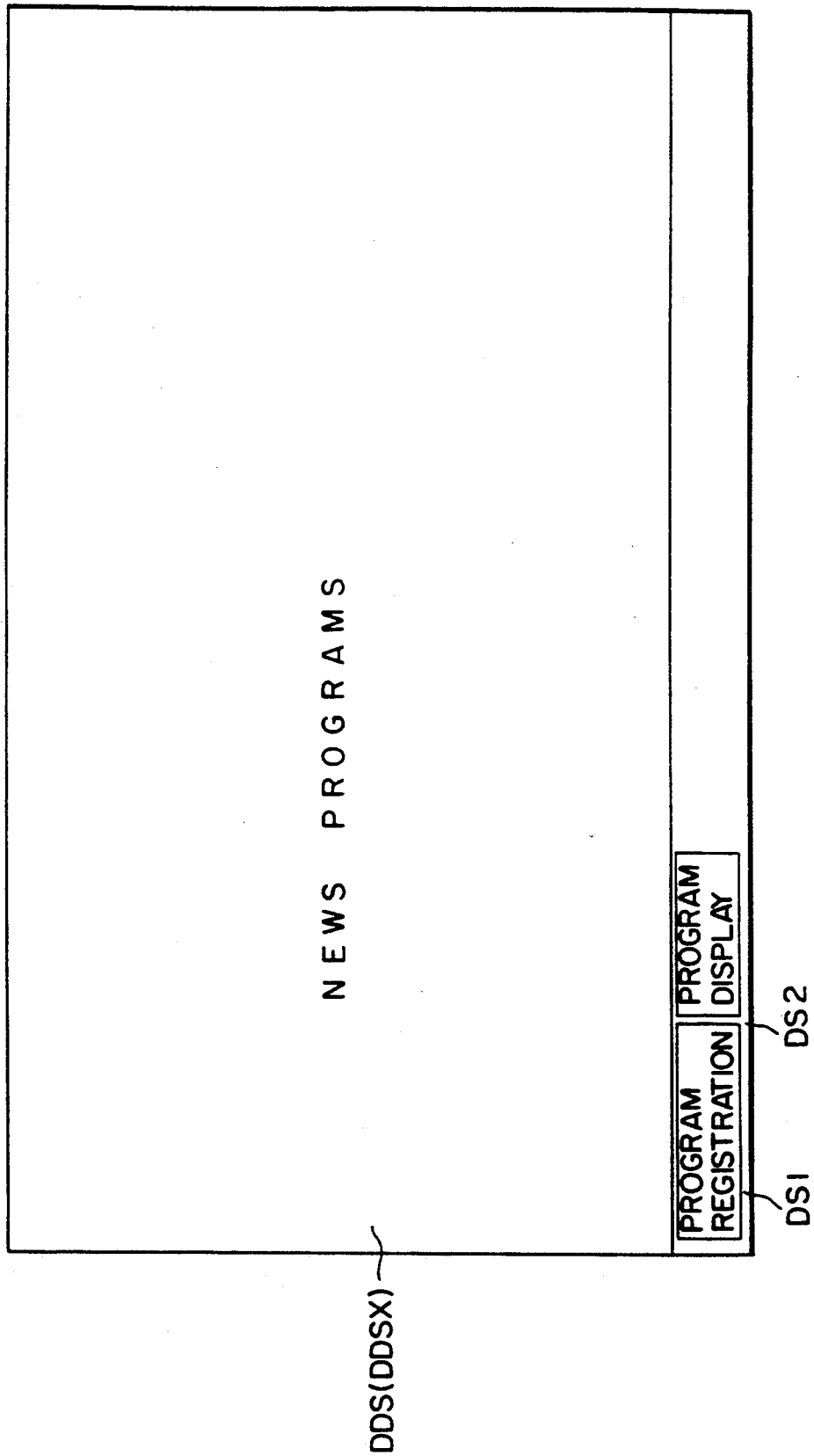
FIG. 5 to FIG. 10 are schematic diagrams showing display screens of workstations.

If the "Quit" input display portion DS5 in FIG. 6, or DS14 in FIG. 7, is click input, the host workstation 1 is reset to the initial display screen as shown in FIG. 5.

In the case of FIG. 8, it is shown therein that eight "items", i.e., "The Strengthened Yen Passes   120-line 3:00", "D Air Lines, Interview with K 5:00", . . . , "Weather Report 5:00", are already registered for the "program" by the name of "The Evening News".

The news program producing work (FIG. 4) from the above step, attained by the news desk inputting the "items" by handwriting using the host workstation 1, proceeds to the next step SP2.

In the step SP2, the reporter who was assigned to each "item" prepares the news script for the "item" and also selects "materials" for it and sends requests for editing the "materials" in the next step SP3, whereupon the news room edits the "materials" and then, in step SP4, adds ID codes to the "materials". Thus, the edited "materials" are brought into a registered state in the news program broadcasting system.

In succession thereto, the reporter prepares a cue sheet CUS in step SP5 for each allotted item using the workstation 5A, 5B, . . . , 5K.

This work is started, as described above with reference to FIG. 6 and FIG. 8, by reading out the "item", registered in the host workstation 1 by the news desk, from the workstation 5A, 5B, . . . , 5K through the local transmission line 4. Then, the same list of items as described above with reference to FIG. 8 is displayed on the display screen DDSX of the workstation 5A, 5B, . . . , 5K. Then, the reporter click inputs the name of the item, for example, "The Strengthened Yen Passes 120-line 3:00" which is now intended to be produced and also click inputs the "Cue Sheet" input display portion DS21.

Figure 9:
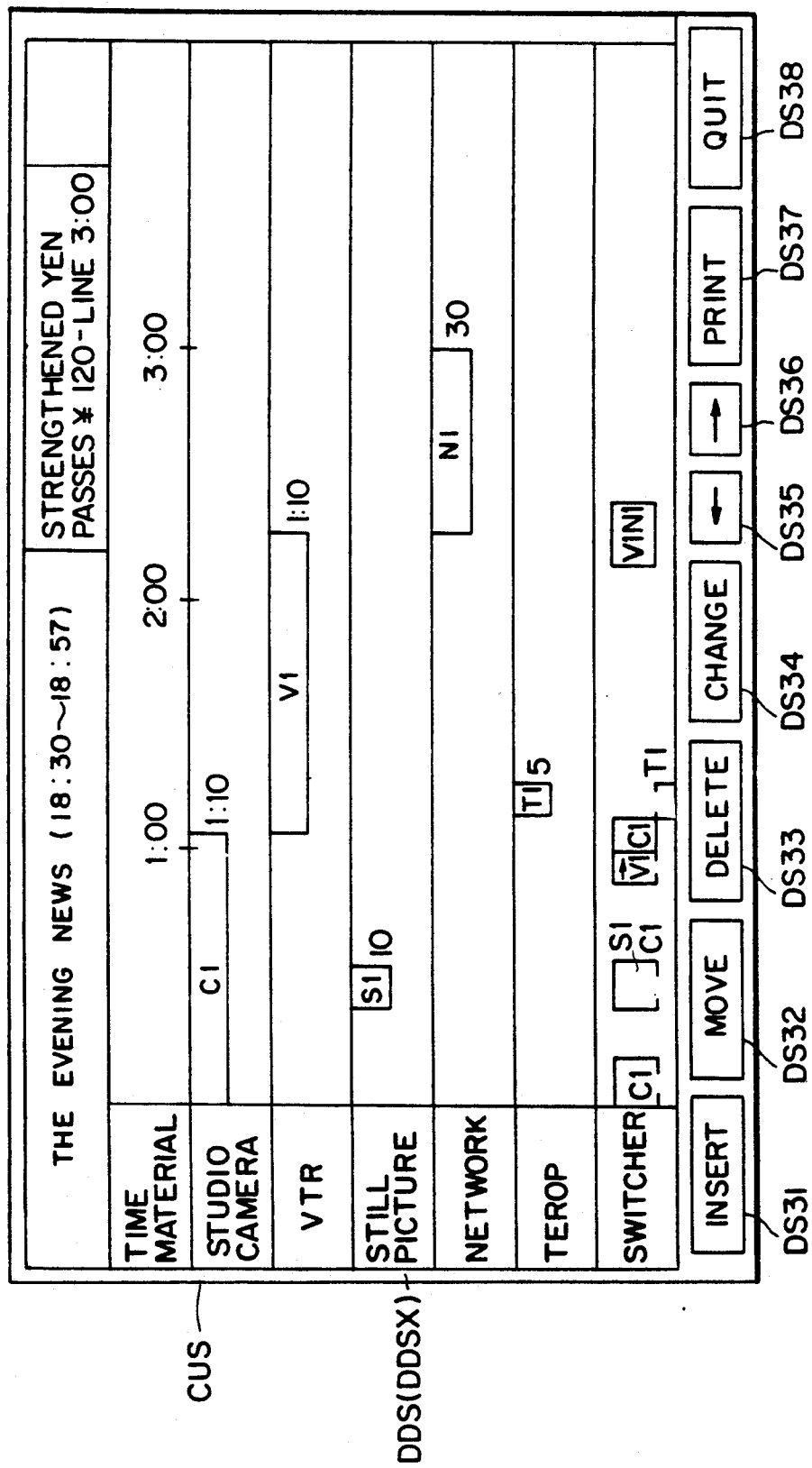

Then, on the display screen DDSX of the workstation 5A-5K is displayed an image of a cue sheet CUS as shown in FIG. 9.

The image of the cue sheet CUS has displays of the program name "The Evening News" and the item name "The Strengthened Yen Passes 120-line 3:00" and, additionally, a display of vertically arranged several horizontally-elongated spaces each thereof indicating the period of time allotted to each material, i.e., "Studio Camera", "VTR", "Still Picture", "Network", "Telop", and "Switcher". Namely, in this cue sheet CUS is given an arrangement according to the time of the "materials" used in the "item".

In preparing the cue sheet CUS, the reporter, according to the need, click operates "Insert", "Move", "Delete", "Change", "←", "→", and "Print" input display portions DS31, DS32, DS33, DS34, DS35, DS36, and DS37.

Figure 10:
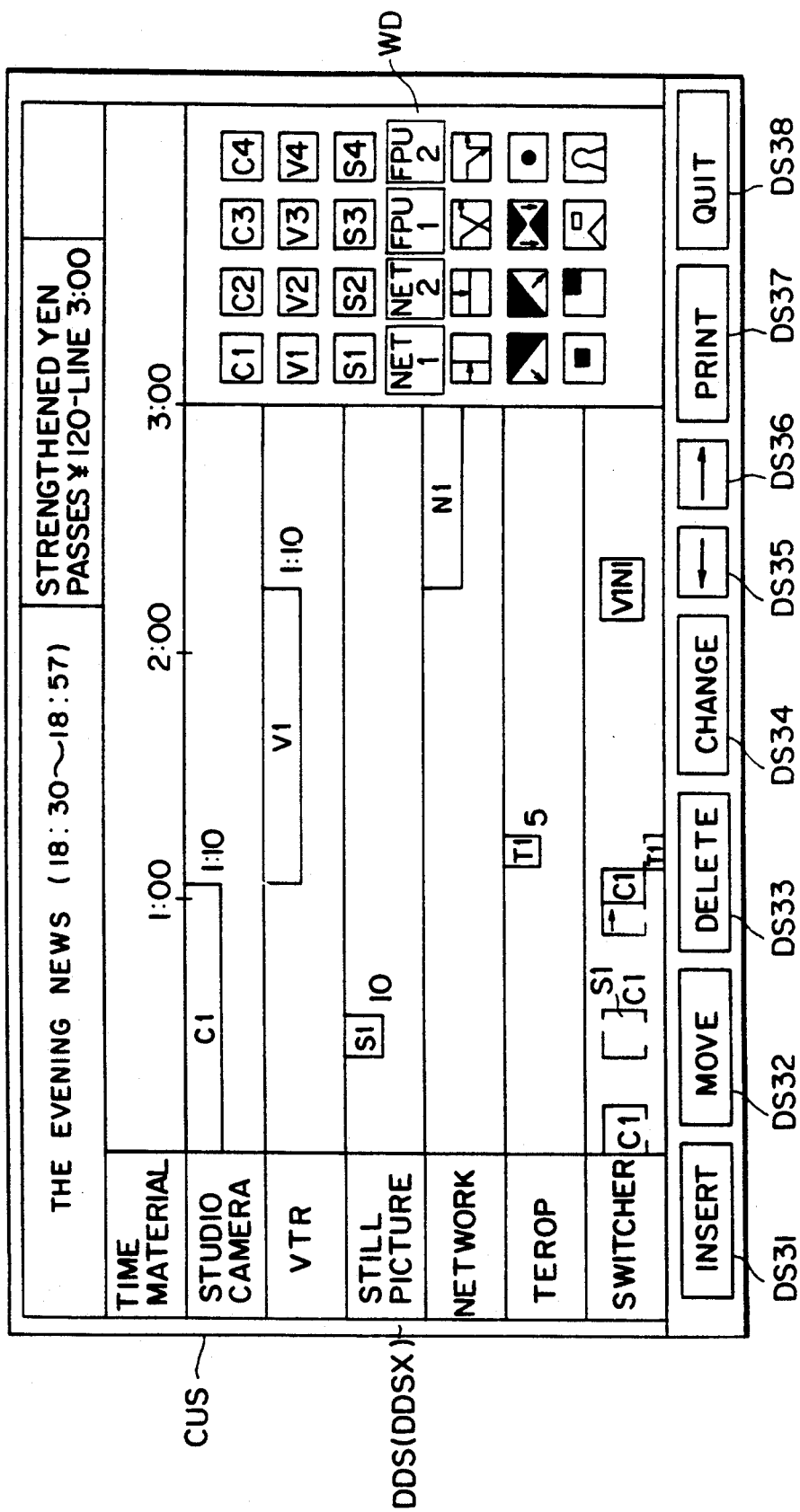

When the "Insert" input display portion DS31 is click input, a window is opened on the right-hand side of the cue sheet CUS as shown in FIG. 10, whereby the reporter is enabled to select "materials" or "switcher effects".

In the present embodiment, four studio cameras C1-C4, four VTRs V1-V4, four still pictures S1-S4, two network pictures NET1 and NET2, two telops FPU1 and FPU2 are arranged for selection as the "materials" and 12 effects are arranged to be selected. Since selecting marks of these "materials" and "switcher effects" are arranged in the window WD, when the reporter click inputs a selected "material" or "switcher effect", the cursor moves to the period-of-time space for the selected "material" or "switcher effect", so that it becomes possible to click input the starting time and ending time of the "material" or "switcher effect".

In the case of the embodiment shown in FIG. 10, the item "The Strengthened Yen Passes 120-line 3:00" is formed of an arrangement of 3 minutes of materials, of which use of the studio camera C1 is registered for the period from "0:00" to 1 minute 10 seconds ("1:10") within the period of time for "Studio Camera", use of the VTR V1 is registered for the period of 1 minute 10 seconds ("1:10") from the end of the use of the studio camera C1 at "1:10", and use of the relay network NET1 is registered from the end of the use of the VTR V1 at 2 minutes 20 seconds ("2:20") to the ending time of the item at "3:00", and in the meantime, interrupting insertions of 10 seconds of the still picture S1 and 5 seconds of the telop T1 together with the relative "switcher effects" are registered.

The registered data of the arrangement according to the time of the "materials" expressed on the cue sheet CUS are represented by time codes indicating the arrangement according to the time and material codes allotted to each of the "materials" and "switcher effects". When the preparation of the cue sheet CUS is finished, the cue sheet data are transmitted from the workstation 5A-5K through the local transmission line 4 to the host workstation 1 and stored therein.

In FIG. 9 and FIG. 10, if the "Move" input display portion DS32 is click input and also a click input action is made after the cursor has moved onto the display of a "material" or "switcher effect" which is already input, then the "material" or "switcher effect" is rendered movable along the time axis (i.e., to the left or right) on the screen. By making a click input action after moving the display to a desired position, the movement of the "material" or "switcher effect" along the time axis is effected.

By click inputting the "Delete" input display portion DS33 and making a click input action after moving the cursor onto the display of a "material" or "switcher effect" which is desired to be deleted, the "material" or "Switcher effect" can be deleted.

If the "Change" input display portion DS34 is click input and, then, a first and second "material" displays or "switcher effect" displays which are desired to be exchanged are successively click input, the "materials" or "switcher effects" can be changed for each other.

The "←" and "→" input display portion DS35 and DS36 make it possible to move the cursor forward or backward along the time axis during the click inputting operation.

When the "Print" input display portion DS37 is click input, the cue sheet CUS on the display screen DDSX can be printed out as it is.

When the preparation of the cue sheet CUS is finished through the above operations and the "Quit" input display portion DS38 is click input, the display screen DDSX is reset to the initial picture as shown in FIG. 5.

When the thus prepared cue sheets CUSs using the workstation 5A-5K are registered and stored in the host workstation 1, the host workstation 1, at step SP6 (FIG. 4), automatically checks the ID codes of the "materials" constituting the cue sheet CUS prepared for each "item" with the ID codes added to the "materials" edited at the steps SP3 and SP4 for any disagreement therebetween.

If they are in agreement, it means that the "materials" used in the cue sheet CUS are being registered in their edited states, and this further means that the "materials" are in a stand-by state so that they can be successively transmitted according to the cue sheet CUS.

Whether the "materials" on the cue sheets CUSs for each "item" are in the stand-by state or not is confirmed in the steps at and after the step SP7.

More particularly, at the step SP7 and following steps (which correspond to steps during the on-air period), the news staff member according to the need is enabled to confirm whether or not the "materials" to be transmitted according to the cue sheets CUSs are in stand-by states for each "material" and "item", and, taking the possibility of occurrence of a change in the "item" in an urgent case into consideration, transmits the "materials" constituting each "item" one by one by operating a take key TAKE (a switch for transmission) according to the order indicated in the cue sheet CUS.

In the case of the present embodiment, the automatic controller 2 has an item monitor MR1 and a material monitor MR2, and it is thereby made possible to confirm at the step SP7 whether the "materials" included in each "item" are already in stand-by states or not by having index images formed of still pictures displayed by taking the following procedure.

Figure 11:
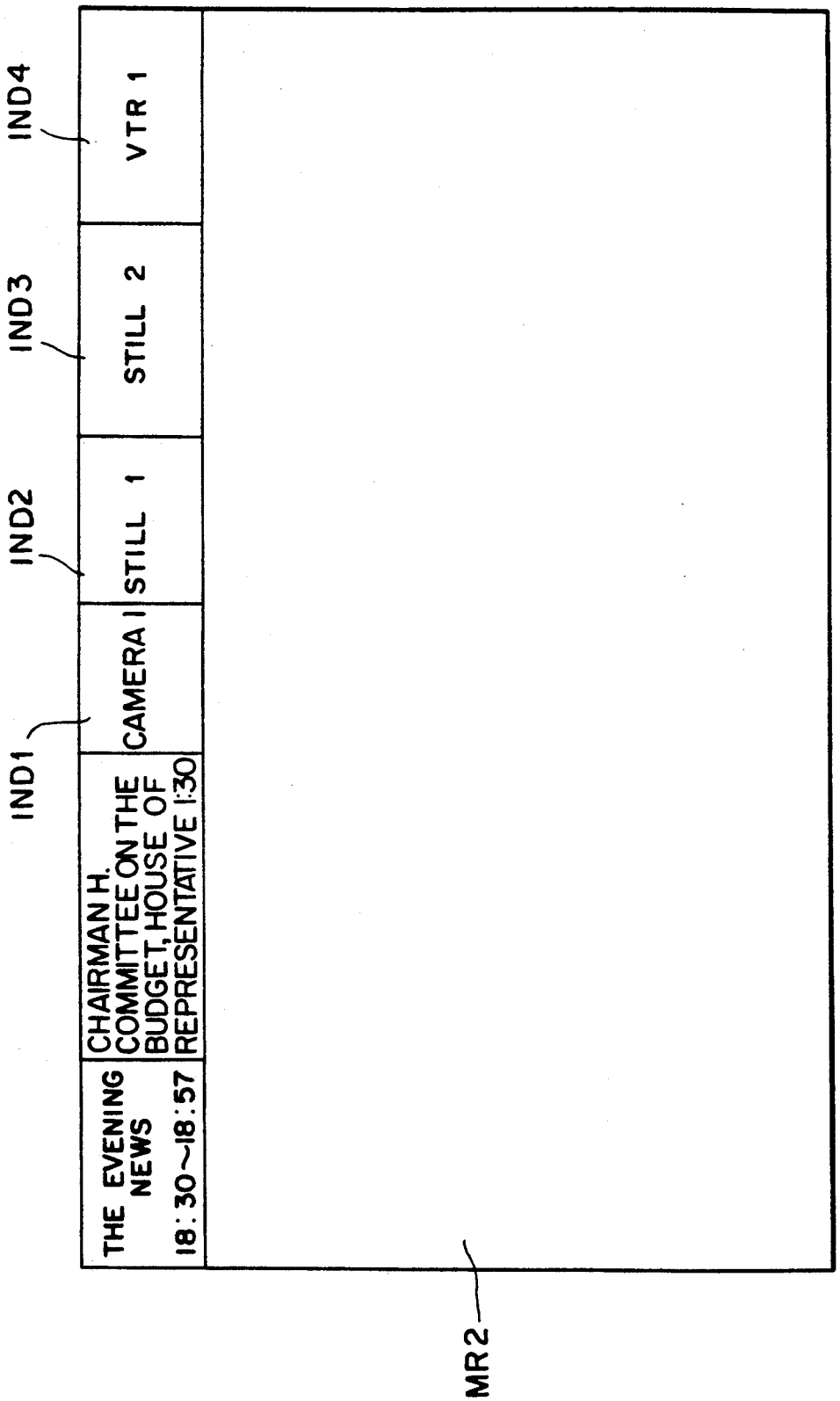
FIG. 11 and FIG. 12 are schematic diagrams showing display screens of a material monitor.
Figure 12:
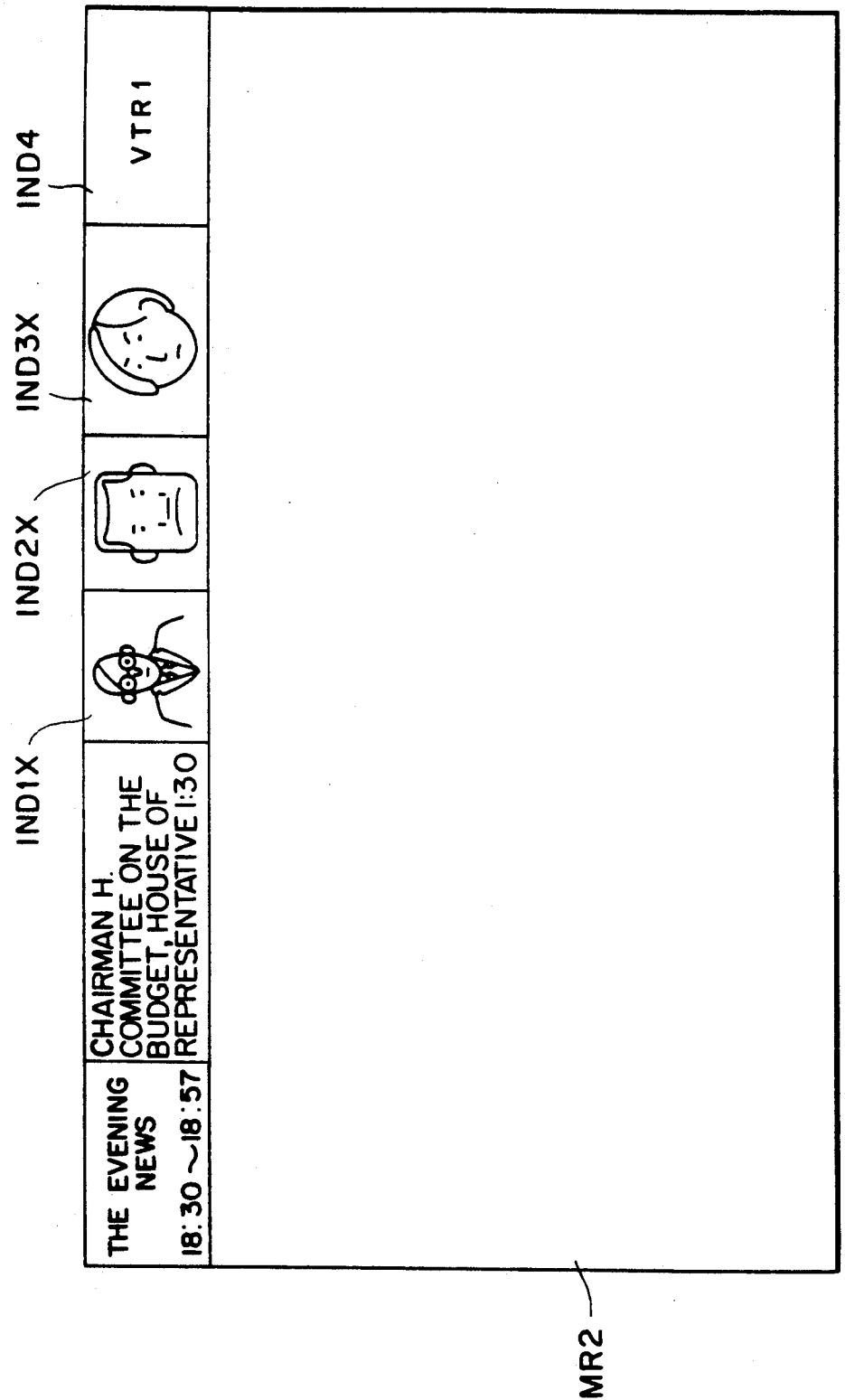

In the case of the present embodiment, if, in the state of the host workstation 1 with the item images as shown in FIG. 8 displayed thereon, the display of an item, for example "Chairman H of Committee on the Budget, the House of Representatives 1:30" is click input and also the "Material Monitor" input display portion DS26 is click input, then an image of a table of materials as shown in FIG. 11 or FIG. 12 is displayed on the material monitor MR2.

The image of the table of materials as shown in FIG. 11 includes a display of the item "Chairman H of Committee on the Budget, the House of Representatives 1:30" and material name displays of the "materials" arranged as a table of the "materials" used according to the cue sheet CUS prepared for that item, i.e., "Camera 1", "Still Picture 1", "Still Picture 2", and "VTR1".

At this time, for the material of which the material code on the cue sheet CUS has not agreed with the material code of the edited material as the result of the automatic checking of the ID codes at the above step SP6, the display for the material name is left as a display of characters as shown in FIG. 12 (this image will be called "material name image").

In contrast, when those materials which have agreed at the automatic checking are generated, each time one of these appears, a material index image IND1X, IND2X, IND3X is displayed, as the material display, at the position where the material name image IND1, IND2, IND3 was displayed, whereas if there still is a material which does not agree at the automatic ID checking, it is left as a material name image IND4.

Here, as the material index images IND1X, IND2X, IND3X, those images simply and plainly indicating the contents of the "item", such as still pictures formed of a first picture are used so that the news item can be known at a glance.

By so doing, the state of the production in progress of the materials forming the item, i.e., whether or not they are completed and in a stand-by state can be easily checked by watching the material monitor MR2 of the automatic controller 2.

Such confirmation is attained at step SP8 by observing that the material images for all the items are in the stand-by state.

Such processing at the step SP8 is performed in the host workstation 1, with the item image as shown in FIG. 8 displayed on its display screen, by successively click inputting the displays of the items. Then, the displays on the material display MR2 are switched from one to another.

At the same time, the automatic controller 2, at step SP9, monitors using the item monitor MR1 as to whether or not each "item" is brought into a stand-by state by using an index image to each "item", for example the index image of the first material.

Figure 13:
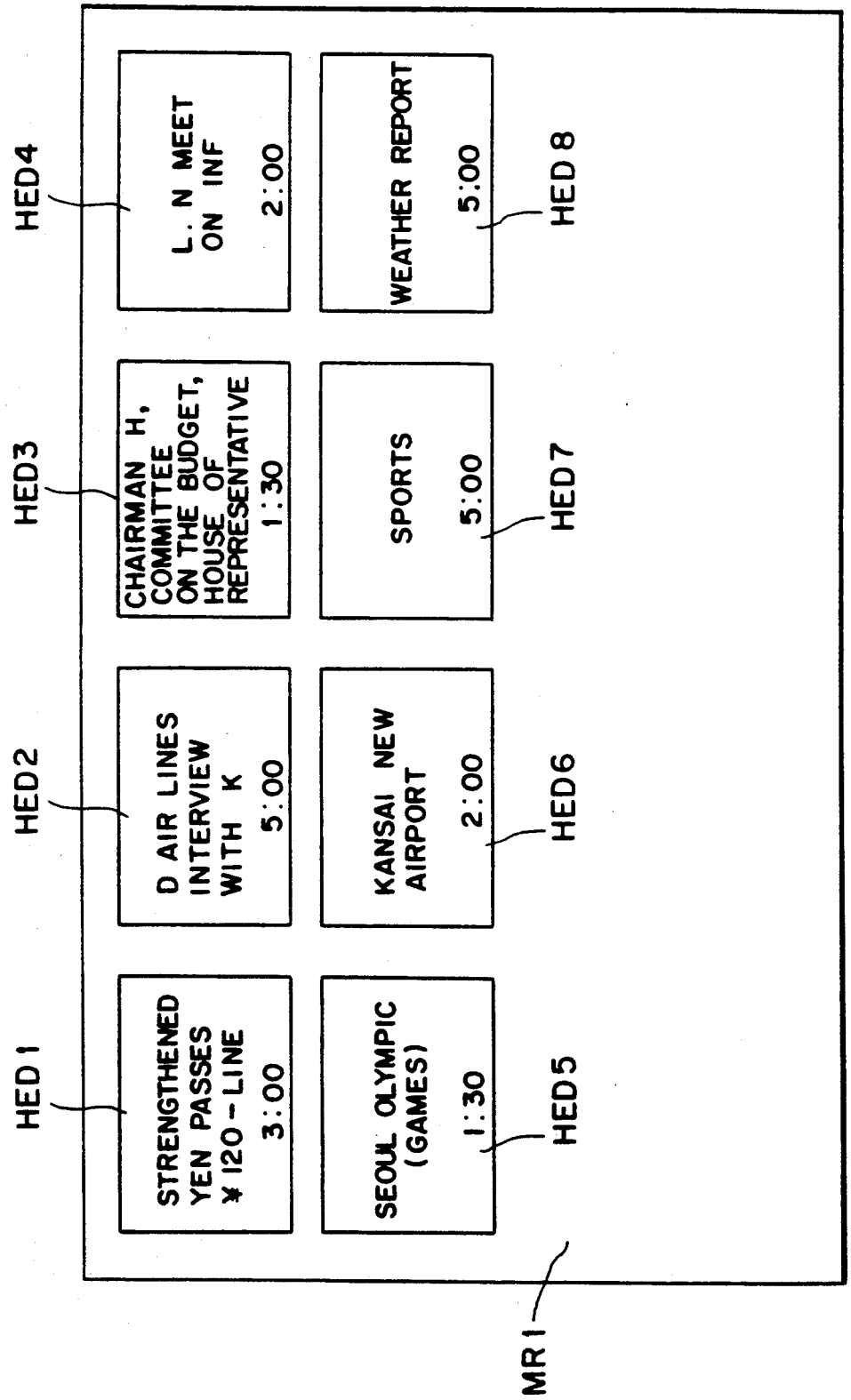
FIG. 13 and FIG. 14 are schematic diagrams showing display screens of an item monitor.
Figure 14:
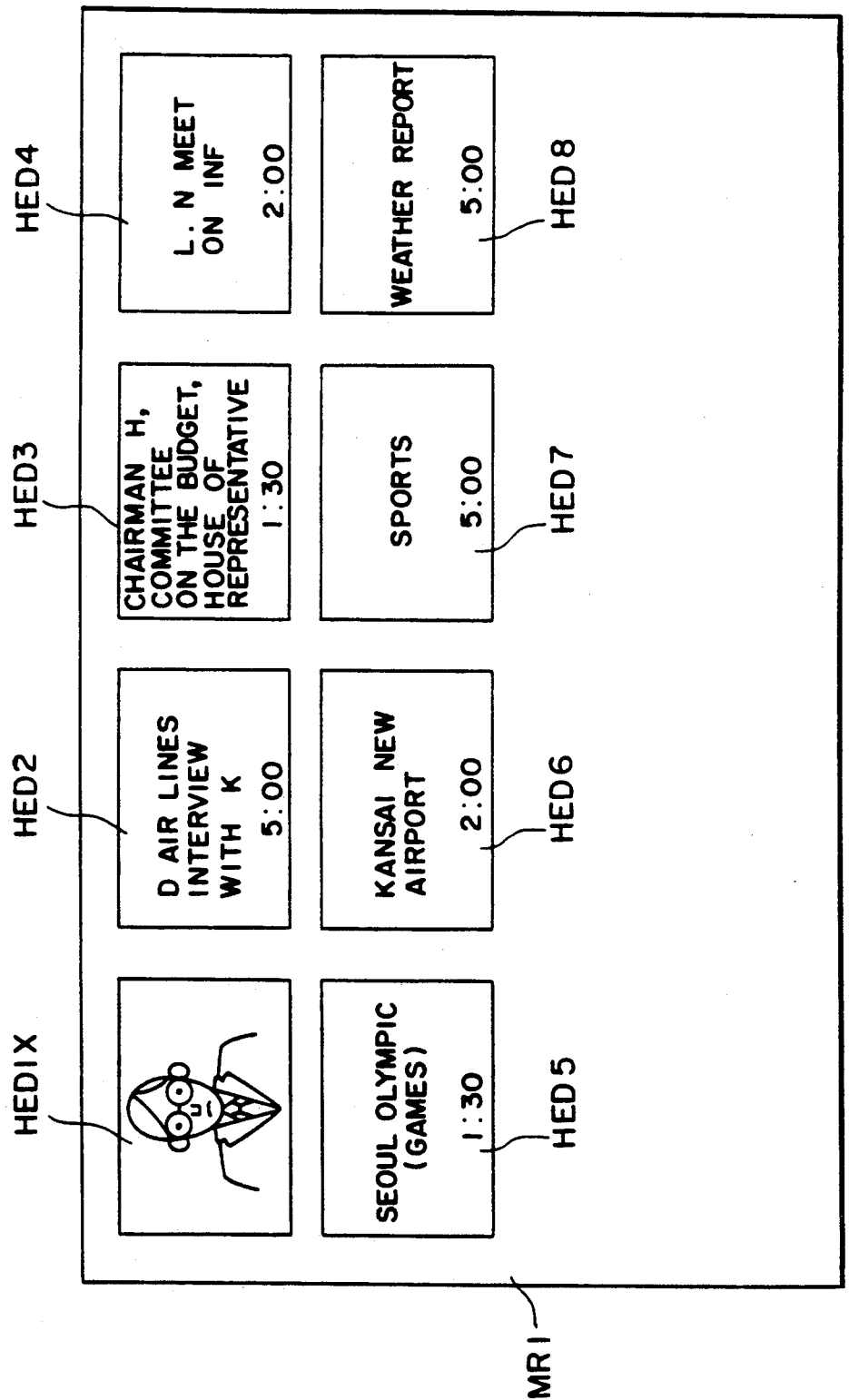

The item monitor MR1 constantly holds on the display screen thereof the item name images HED-1-HED8 arranged in a table as shown in FIG. 13 and FIG. 14 from when the item names were registered by handwriting input in the host workstation 1 (FIG. 13).

When all of the "materials" for an "item" are brought into the stand-by state, the item name image HED1 which has been displayed up to that time is exchanged, at the same position, with an item index image HED1X, which is, for example, formed of the first index image IND1X out of the index images IND1X, IND2X, IND3X for all the "materials" included in the item, in the same way as described with reference to FIG. 12.

Thus, the news staff member can easily grasp the state of production of the overall news program in progress by watching the item monitor MR1.

In this way, when all the images forming the table of the items on the item monitor MR1 have been exchanged with the item index images, it is meant thereby that the "materials" for the "item" are all in the stand-by state. Then, the news staff member, at step SP10, operates the take key TAKE provided on the automatic controller 2, whereby the "materials" included in the "item" constituting the cue sheet are transmitted through the program switcher 3 as the main line output $BD_{OUT}$ one by one from the first "material" each time the take key TAKE is operated.

In such an on-air state, if, for example, an urgent tape 15 is brought in, then, as described with reference to FIG. 2, the tape is mounted on the VTR cart system 14 as a tape 16 for urgent transmission without any ID data given, and it is thereby urgently registered in the news program broadcasting system NEWS.

Then, the news staff member, according to the need, operates the host workstation 1 at step SP11 to carry out item exchanging work.

More particularly, in the host workstation 1 with the item images read out thereon as described with reference to FIG. 8, the "Change" input display portion DS22 is click input, and then, the items that are desired to be exchanged are click input in succession.

By making such an exchange operation, the materials included in the item, having the IDs designated to be exchanged, of the material IDs written in the material ID file in the host workstation 1 are exchanged all together with the urgent file.

Thus, when an urgent news item is carried in at an on-air period, it can be specially transmitted by replacing the "materials", which have already been registered and given certain IDs, with such an urgent material.

According to the above described arrangement, a reporter gives material IDs to the "materials" prior to the edition and then prepares a cue sheet CUS using the material IDs, and, thereafter, the "materials", of which material IDs in the cue sheet CUS and the material IDs of the edited materials have been determined to be in agreement at the automatic ID checking, are transmitted as the main line output $BD_{OUT}$. Thus, the news program broadcasting system NEWS as a whole allows easier control of "materials".

As a result, confirmation as to whether the production of the materials to be transmitted have been completed or not, replacing normally prepared materials with an urgent material, etc. can be performed based on the material IDs added to the "materials". Thus, processing of news materials can be promptly and accurately executed by the news program broadcasting system, combined with decision made as required by the news staff member through the manual monitoring operations.

In the above embodiment, the news materials whose order of transmission is specified in the cue sheet CUS are adapted to be displayed on the material monitor MR2 as an image of a table of materials arranged in the order of transmission, and hence, the state of the production in progress of the news materials constituting each item can be firmly grasped from the material monitor MR2.

Further, in the above embodiment, in displaying the "materials" as an image of a table of materials on the material monitor MR2, it is adapted such that index images are displayed at the positions of the "materials" which have been determined to be in agreement at the automatic ID checking. Hence, the news materials which are brought into a stand-by state can be positively observed at a glance. In such arrangement, for a news material not in agreement at the ID checking, the fact that it has not yet passed in the ID checking is adapted to be indicated in some way (in the case of the above described embodiment, for example, the character display as input by handwriting is left displayed as a material name image IND4 (FIG. 12)), and therefore, the "materials" which are in the stand-by state can be confirmed much easier.

In the above described embodiment, there is provided an item monitor MR1, and the news items used in a news program are adapted to be displayed thereon in an arrangement to indicate their order of transmission, and further, the displays at the positions indicating the news items whose production has already been completed are adapted to be replaced with index images such as the index image HED1X (FIG. 14), and therefore, the state of production in progress of the pertinent news program can be easily and certainly observed, and thus the news program can be put on the air without fear.

Figure 16:
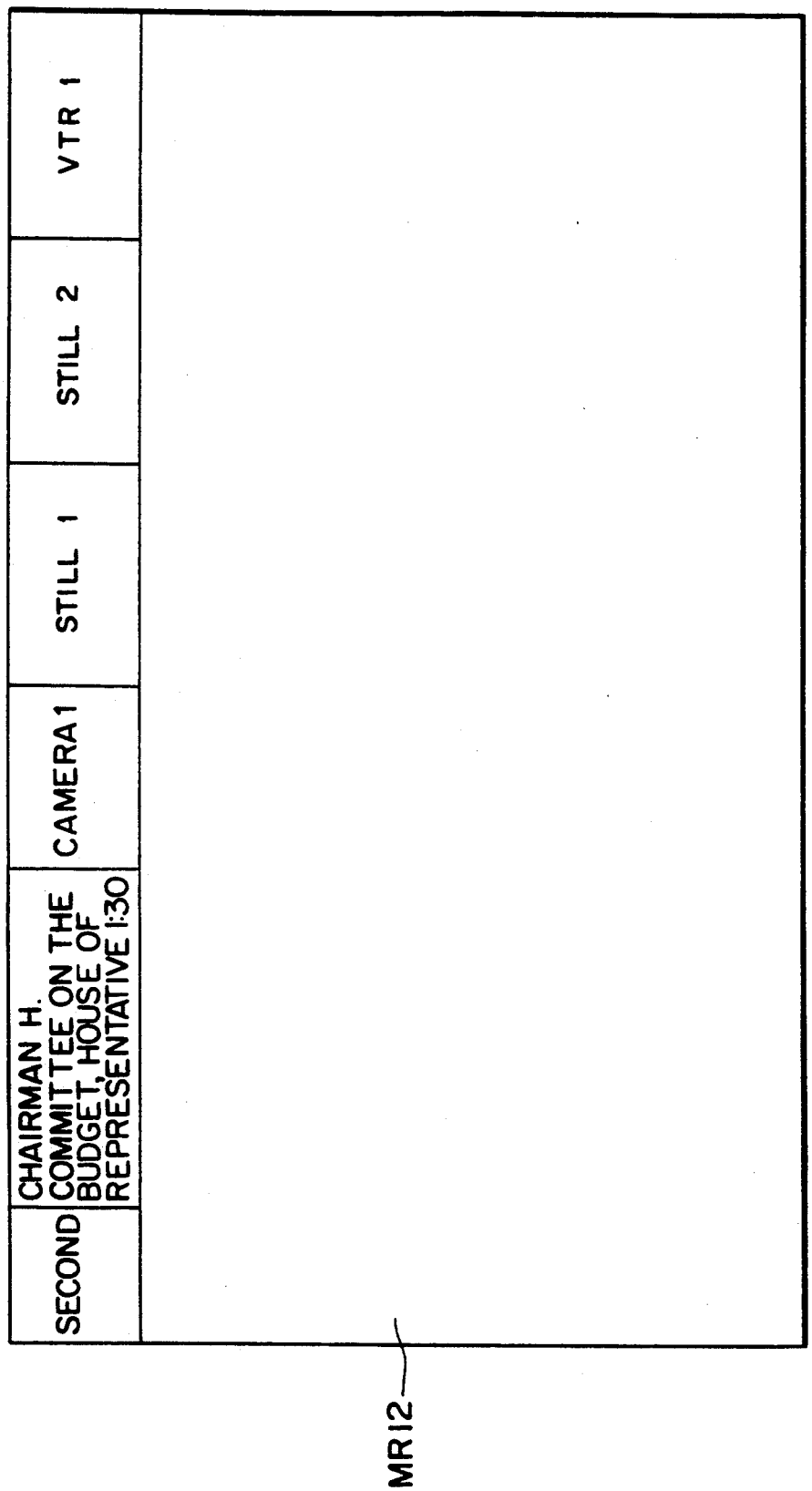

Although the case where only one material monitor MR2 was used for the material monitor was described above with reference to FIG. 11 and FIG. 12, two material monitors MR11 and MR12 can be provided, instead, as shown in FIG. 15 and FIG. 16, wherein a first material monitor MR11 is arranged to display those "materials" of the news item to be currently put on the air, i.e., the on-air item ONAIR as an image of a table of materials, and, in addition thereto, to display the "materials" constituting the news item to be transmitted in the next place, i.e., the next item NEXT as an image of another table. The second material monitor MR12 is arranged to display the "materials" constituting the news item to be transmitted as the next item but one, i.e., the second item SECOND as an image of a table of materials.

Figure 17:
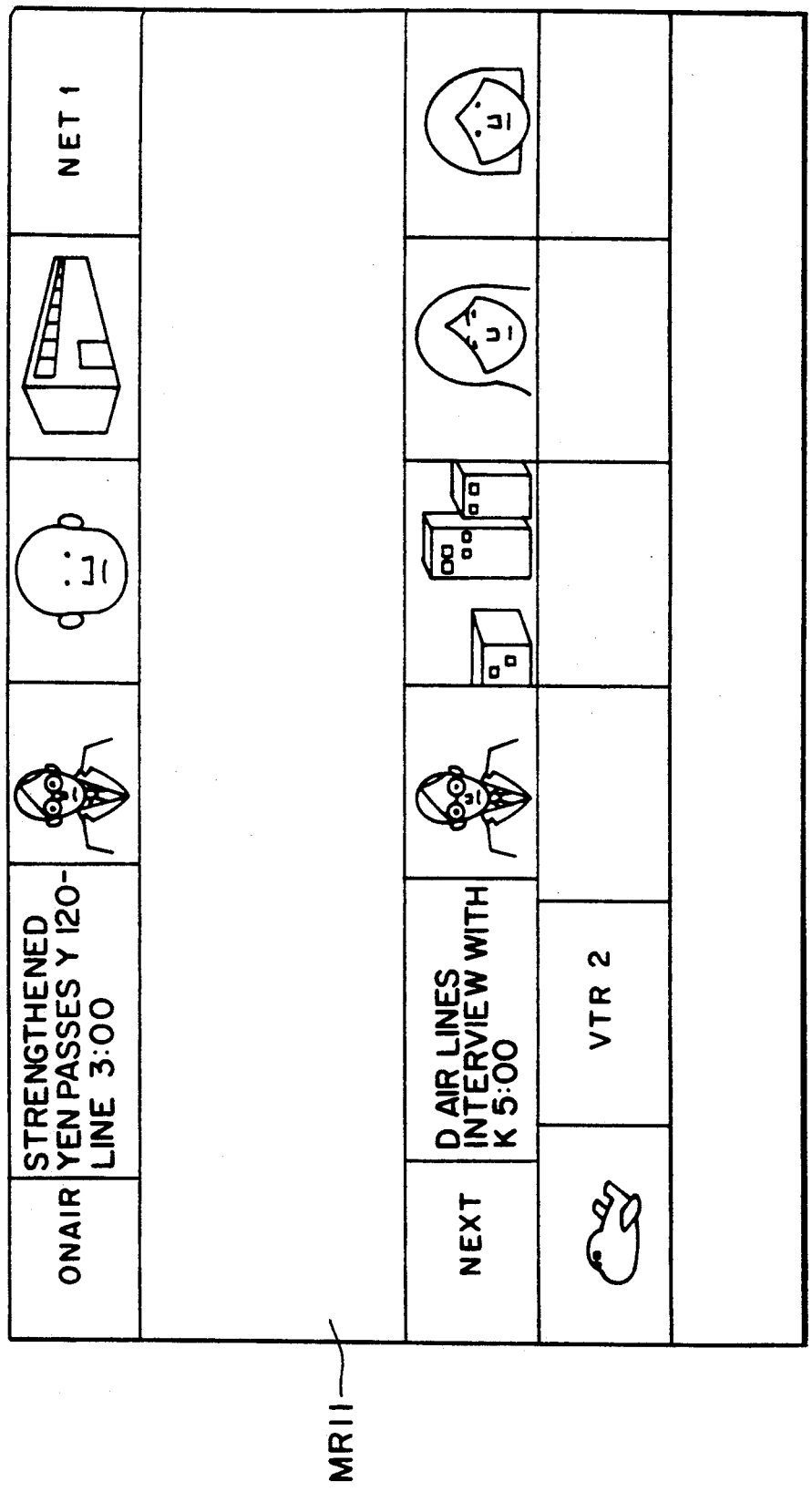
Figure 18:
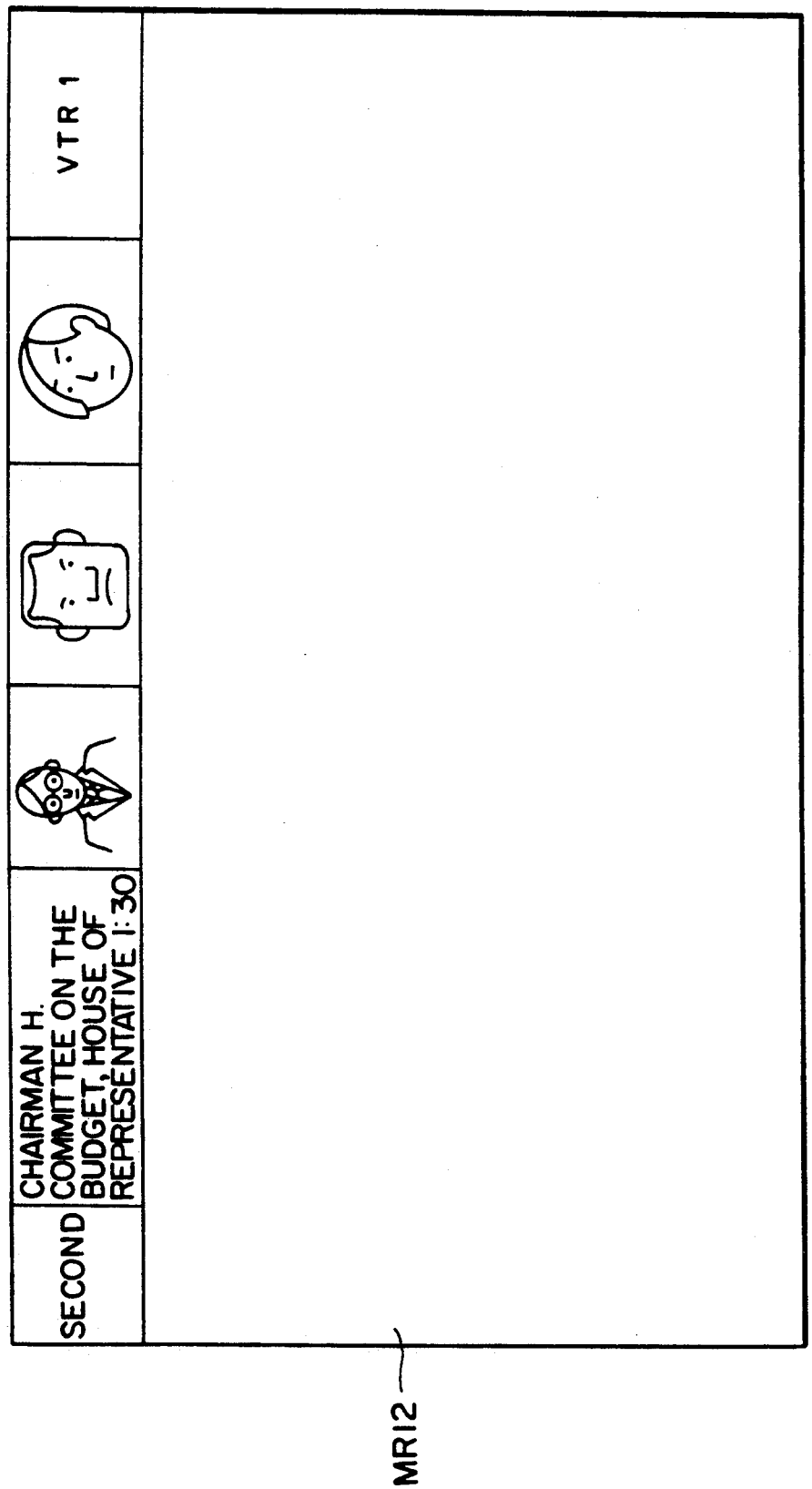
Figure 19:
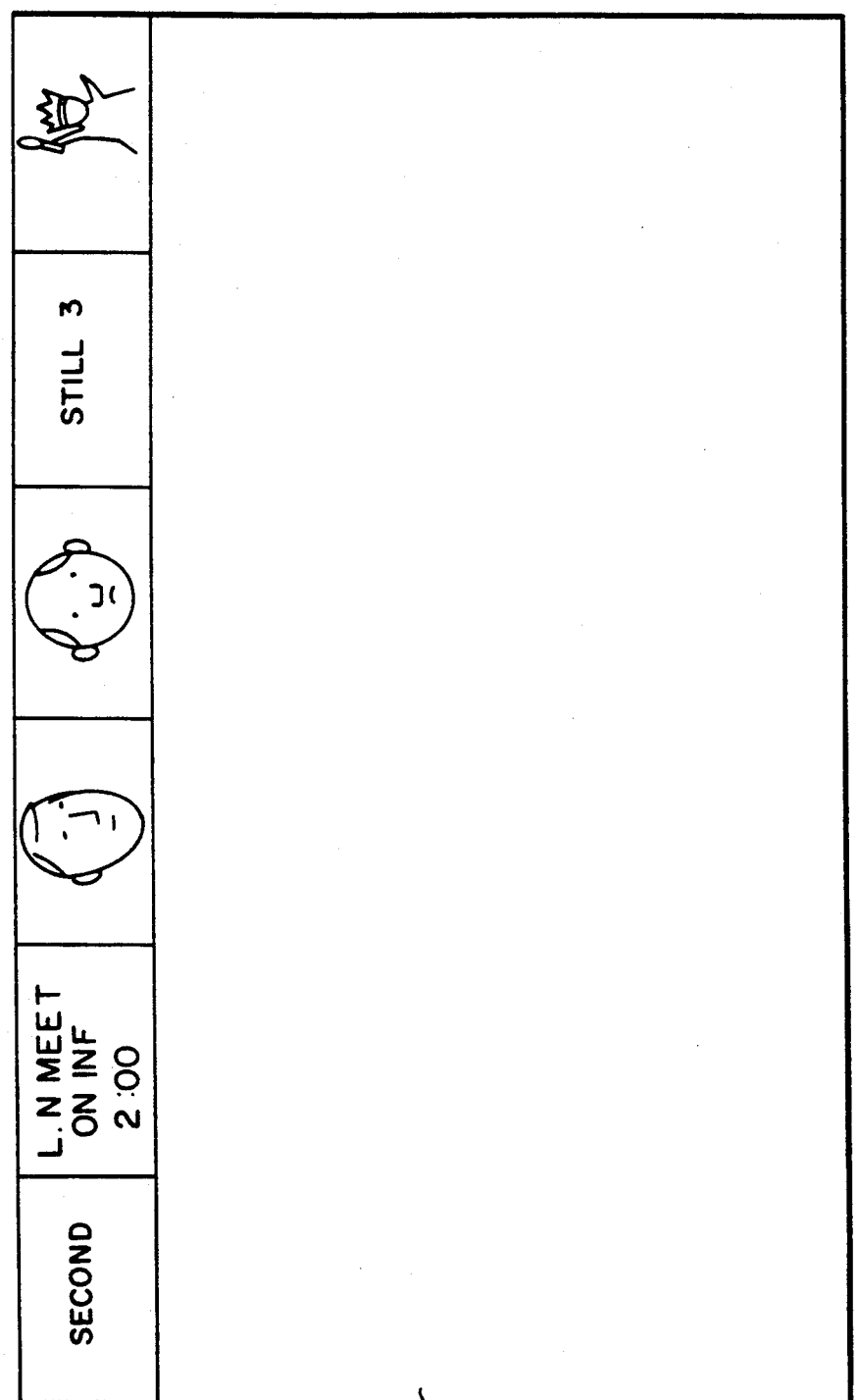
FIG. 19 is a schematic diagram showing a further embodiment of the display screen of a material monitor.

Then, as shown in FIG. 17 and FIG. 18 corresponding to FIG. 15 and FIG. 16, images of the tables of "materials" for the on-air item ONAIR, next item NEXT, and second item SECOND are arranged to be observable at a glance. Thus, the stand-by states of not only the news items to be currently put on the air but also the news items to be successively transmitted in the "next" turn as well as in the "next turn but one" can be visually confirmed, and the transmission of the news program can be carried out with a much secured feeling.

In so doing, if there arises a need for changing the order of transmission of news items while putting an item on the air, the material table image for the replacing "materials" can be displayed as that for the second item SECOND, and thus, their stand-by state can be easily confirmed and, further, this exchange of items is prevented from affecting the display of the item currently put on the air, the on-air item ONAIR.

In the above described embodiment, it was arranged, as shown in FIG. 11 and FIG. 12, that, for the materials determined to be in agreement at the automatic ID checking, the index images IND1X-IND3X were displayed at the same positions as those of the material name images IND1-IND3 to supersede them, and further, as shown in FIG. 13 and FIG. 14, the item index image HEDIX was displayed at the same position as that of the item name image HED1 to supersede it. However, the way of display of the material index image and item index image is not limited to such but various changes can be made.

Figure 20:
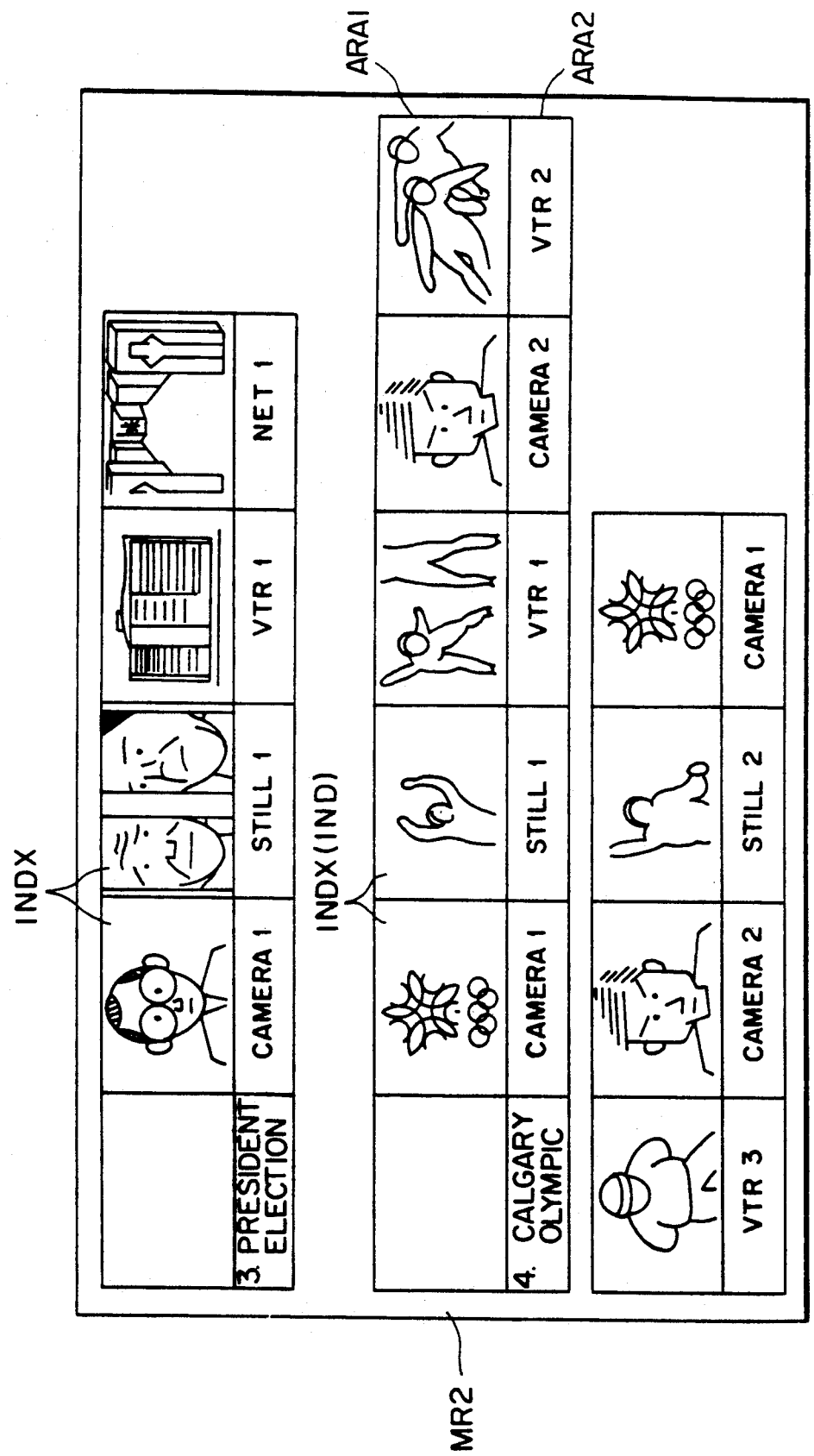

For example, in displaying a material table image and an item table image on the material monitor MR2 and the item monitor MR1 as shown in FIG. 20 and FIG. 21, image display areas ARA1 and ARA11 can be provided and, additionally, in the vicinity of them, for example below them, there can be provided a material name display area ARA2 and an item name display area ARA12, so that, in the first place, there are displayed the material name images and the item name images in the image display areas ARA1 and ARA11, respectively, and in the next place, the material index images and the item index images appear on the display.

By so arranging, the displayed positions in the material name display area ARA2 and item name display area ARA12 are not changed even if the contents of the displayed images are changed, and therefore, the materials and items can be confirmed much easier.

In this embodiment, such an arrangement may also be possible to have the material index images and item index images displayed as blank images until agreement is determined in the automatic ID checking.

As to inputting "programs" and "items", the case where they were input from a tablet by handwriting was described in the embodiment shown in FIG. 6 and FIG. 8, but a keyboard or character recognition means may be used for the inputting to obtain similar effects as obtained in the above described case.

According to the present invention as described so far, ID codes the same as ID codes assigned to the materials constituting a cue sheet are given to the edited "materials" and production of the news materials is controlled based on the ID codes, and thus, a news program broadcasting system, in which news materials are automatically processed until they are put on the air, combined with confirmation of the states of the progress manually made by news staff members as required, can be easily embodied.

What is claimed is:

1. A television program transmission system for transmitting a plurality of materials for transmission in order according to a cue sheet, each of said materials for transmission being assigned a name and said television program transmission system comprising:

cue sheet preparation means for preparing said cue sheet according to contents of a program;

ID code assignment means for assigning an ID code to the name of a material for transmission in said cue sheet;

material-to-be-transmitted registration means for assigning an ID code to material for transmission to be actually transmitted and registering it in the system;

check means for checking said ID code assigned to the name of a material for transmission with said ID code assigned to the material to be transmitted and passing said material to be transmitted when said two ID codes are the same; and transmission means for transmitting said material to be transmitted, of which said ID code has passed in the checking, according to said cue sheet.

2. A television program transmission system according to claim 1, further comprising:

display means for displaying the name of said materials for transmission in said cue sheet in the order of transmission according to said cue sheet; and display switch means for switching displays on said display means for those of said materials for transmission which have passed in the checking by said check means from displays of the names of said materials for transmission to displays indicative of contents of said materials for transmission.

3. A television program transmission system according to claim 1, further comprising:

display means for displaying the names of said materials for transmission in said cue sheet in the order of transmission according to said cue sheet; and checked material-for-transmission display means for making displays indicative of contents of said materials for transmission for those of said materials for transmission which have passed in the checking by said check means adjacent to the displays of the names of said materials for transmission.

4. A transmission system of a news program constituted by a plurality of news items, each news item being formed of a plurality of materials for transmission in order according to a cue sheet, each of said news items and each of said materials for transmission being assigned a name and said news program transmission system comprising:

news item registration means for registering the names of said news items constituting said news program;

cue sheet preparation means for preparing said cue sheet according to contents of said news items;

ID code assignment means for assigning an ID code to the name of a material for transmission in said cue sheet;

material-to-be-transmitted registration means for assigning an ID code to a material for transmission to be actually transmitted and registering it in the system;

check means for checking said ID code assigned to the name of a material for transmission with said ID code assigned to the material to be transmitted and passing said material to be transmitted when said two ID codes are the same;

news item check-detection means for detecting that all said materials to be transmitted in said news item have passed in the checking;

display means for displaying the names of said plurality of news items constituting said news program in order of transmission on a display device; and checked news-item display means for switching displays on said display device of those of said news items which have passed in the check-detection by said news item check-detection means from displays of the names of said news items to displays indicative of contents of said materials transmission forming said news items.

5. A news program transmission system according to claim 4, wherein said display means displays the names of said news items in order of transmission at a first portion of said display device; and said checked news-item display means displays the displays indicative of contents of said materials for transmission forming said news items for those of said news items which have passed in the check-detection by said news item check-detection means on said display device at a second portion of said display device adjoining the first portion.

6. A television program transmission system for transmitting a plurality of materials for transmission in order according to a cue sheet, said television program transmission system comprising:

display means;

arrangement means for preparing said cue sheet and arranging said plurality of materials for transmission in the order according to said cue sheet; and display control means for simultaneously displaying said arranged plurality of materials for transmission on said display means in the same order.

7. A transmission system for a news program constituted by a plurality of news items, each news item being formed of a plurality of materials for transmission in order according to a cue sheet, said news program transmission system comprising:

display means;

arrangement means for preparing said cue sheet and arranging said plurality of materials for transmission in said news item in the order according to said cue sheet; and display control means for displaying said arranged plurality of materials for transmission in a first news item to be transmitted at an upper portion of said display means and displaying said arranged plurality of materials for transmission in a second news item to be transmitted at a lower portion of said display means.

8. A televeision program transmission system for transmitting a plurality of materials for transmission in order according to a cue sheet, each of said plurality of materials for transmission being assigned a name, said television program transmission system comprising:

cue sheet preparation means for preparing said cue sheet according to contents of a program;

ID code assignment means for assigning an ID code to the name of each of said plurality of materials for transmission in said cue sheet;

material-to-be-transmitted registration means for assigning an ID code to each of said plurality of materials for transmission to be actually transmitted and registering them in the system;

check means for checking said ID code assigned to the name of each of said plurality of materials for transmission with said ID code assigned to each of said plurality of materials to be transmitted and passing each of said plurality of materials to be transmitted when its ID code matches one of said ID codes for the name of one of said plurality of materials for transmission; and transmission means for transmitting said plurality of materials to be transmitted having an ID code that has passed in the checking one at a time in an order determined by said cue sheet.

* * * * *